United States Patent
Pane et al.

(10) Patent No.: US 11,665,217 B2
(45) Date of Patent: May 30, 2023

(54) AUTOMATED DETECTION OF MEDIA PORT PROTOCOLS

(71) Applicant: Biamp Systems, LLC, Beaverton, OR (US)

(72) Inventors: Christopher Pane, Fairport, NY (US); Christopher Reid Wulff, Greece, NY (US)

(73) Assignee: Biamp Systems, LLC, Beaverton, OR (US)

( * ) Notice: Subject to any disclaimer, the term of this patent is extended or adjusted under 35 U.S.C. 154(b) by 141 days.

(21) Appl. No.: 17/173,182

(22) Filed: Feb. 10, 2021

(65) Prior Publication Data

US 2021/0250397 A1   Aug. 12, 2021

Related U.S. Application Data

(60) Provisional application No. 62/972,577, filed on Feb. 10, 2020, provisional application No. 62/972,581, filed on Feb. 10, 2020.

(51) Int. Cl.

| | |
|---|---|
| *H04L 65/65* | (2022.01) |
| *H04L 47/125* | (2022.01) |
| *H04L 47/24* | (2022.01) |
| *H04R 3/00* | (2006.01) |
| *H04R 5/04* | (2006.01) |
| *H04L 65/70* | (2022.01) |
| *H04L 65/1101* | (2022.01) |

(52) U.S. Cl.
CPC ............ *H04L 65/65* (2022.05); *H04L 47/125* (2013.01); *H04L 47/24* (2013.01); *H04L 65/1101* (2022.05); *H04L 65/70* (2022.05); *H04R 3/005* (2013.01); *H04R 5/04* (2013.01)

(58) Field of Classification Search
CPC ....... H04L 65/60; H04L 65/65; H04L 47/125; H04L 47/24; H04L 65/1101; H04L 65/70; H04L 65/765; H04R 3/005; H04R 5/04
USPC ......................................................... 709/231
See application file for complete search history.

(56) References Cited

U.S. PATENT DOCUMENTS

| | | | |
|---|---|---|---|
| 6,182,146 B1 * | 1/2001 | Graham-Cumming, Jr. | ................. H04L 61/00 709/224 |
| 7,411,915 B1 * | 8/2008 | Spain | ................. H04L 41/0806 370/254 |
| 2009/0049175 A1 * | 2/2009 | Finn | ...................... H04L 12/462 709/226 |
| 2010/0318917 A1 | 12/2010 | Holladay et al. | |
| 2014/0036914 A1 * | 2/2014 | Samuels | .......... G08B 13/19656 370/390 |

\* cited by examiner

*Primary Examiner* — Tan Doan

(57) ABSTRACT

One example method of operation may include identifying data traffic on one or more ports of a switch, determining whether a protocol specific packet type is identified on any of the one or more ports, assigning one or more first ports with data traffic to a first protocol when the protocol specific packet type is identified, and assigning one or more second ports with data traffic to a second protocol different from the first protocol.

20 Claims, 7 Drawing Sheets

AUTOMATED DETECTION OF MEDIA PORT PROTOCOLS

CROSS-REFERENCE TO RELATED APPLICATIONS

This application claims priority to earlier filed U.S. provisional patent application No. 62/972,577 filed on Feb. 10, 2020 entitled, "AUTOMATIC DETECTION OF NETWORK MEDIA PORT ROLE," and U.S. provisional patent application No. 62/972,581 filed on Feb. 10, 2020 entitled, "ETHERNET SWITCH WITH A/V ENDPOINT FUNCTIONALITY," both of which are hereby incorporated by reference in their entirety.

BACKGROUND

Conventionally, a switch or related network device may be used passively to exchange data to and from devices which are plugged into the port either wired line connections and/or wirelessly. A port may be connected to a device that is using one or more types of media control protocols, such as those which are categorized by the layer-two of the open system interconnection (OSI) model. By analyzing the packet data, the protocols which are attempting to be used by external devices may be readily identified and the switch can be configured to support those protocols in an automated manner. Generally, a port is assigned upfront and is not dynamically adjusted for any purpose related to protocols.

Additionally, a switch is generally limited to packet sharing operations. However, in audio and related technologies switches may be commonly interfaced with devices that are seeking various data input and output which is beyond the scope of mere layer-two data formats and may include output signals.

SUMMARY

Example embodiments of the present application provide at least a method that includes one or more of identifying data traffic on one or more ports of a switch, determining whether a protocol specific packet type is identified on any of the one or more ports, assigning one or more first ports with data traffic to a first protocol when the protocol specific packet type is identified, and assigning one or more second ports with data traffic to a second protocol different from the first protocol.

Another example embodiment may include an apparatus that includes a processor configured to identify data traffic on one or more ports, determine whether a protocol specific packet type is identified on any of the one or more ports, assign one or more first ports with data traffic to a first protocol when the protocol specific packet type is identified, and assign one or more second ports with data traffic to a second protocol different from the first protocol.

Another example embodiment may include a non-transitory computer readable storage medium configured to store instructions that when executed cause a processor to perform one or more of identifying data traffic on one or more ports of a switch, determining whether a protocol specific packet type is identified on any of the one or more ports, assigning one or more first ports with data traffic to a first protocol when the protocol specific packet type is identified, and assigning one or more second ports with data traffic to a second protocol different from the first protocol.

Still another example embodiment may include a method that includes identifying data traffic, intended for a network element, received on one or more switch ports of a switch, identifying additional data traffic received on the one or more switch ports, which is to be rendered and played on an audio device attached to the one or more switch ports, forwarding the data traffic to the network element on a first switch port, and outputting the additional data traffic as audio on a second port to a loudspeaker attached to the second port.

Still yet another example embodiment may include an apparatus that includes a processor configured to identify data traffic, intended for a network element, received on one or more switch ports of a switch, identify additional data traffic received on the one or more switch ports, which is to be rendered and played on an audio device attached to the one or more switch ports, forward the data traffic to the network element on a first switch port, and output the additional data traffic as audio on a second port to a loudspeaker attached to the second port.

Still yet another example embodiment may include a non-transitory computer readable storage medium configured to store instructions that when executed cause a processor to perform identifying data traffic, intended for a network element, received on one or more switch ports of a switch, identifying additional data traffic received on the one or more switch ports, which is to be rendered and played on an audio device attached to the one or more switch ports, forwarding the data traffic to the network element on a first switch port, and outputting the additional data traffic as audio on a second port to a loudspeaker attached to the second port.

DETAILED DESCRIPTION

Figure 1:
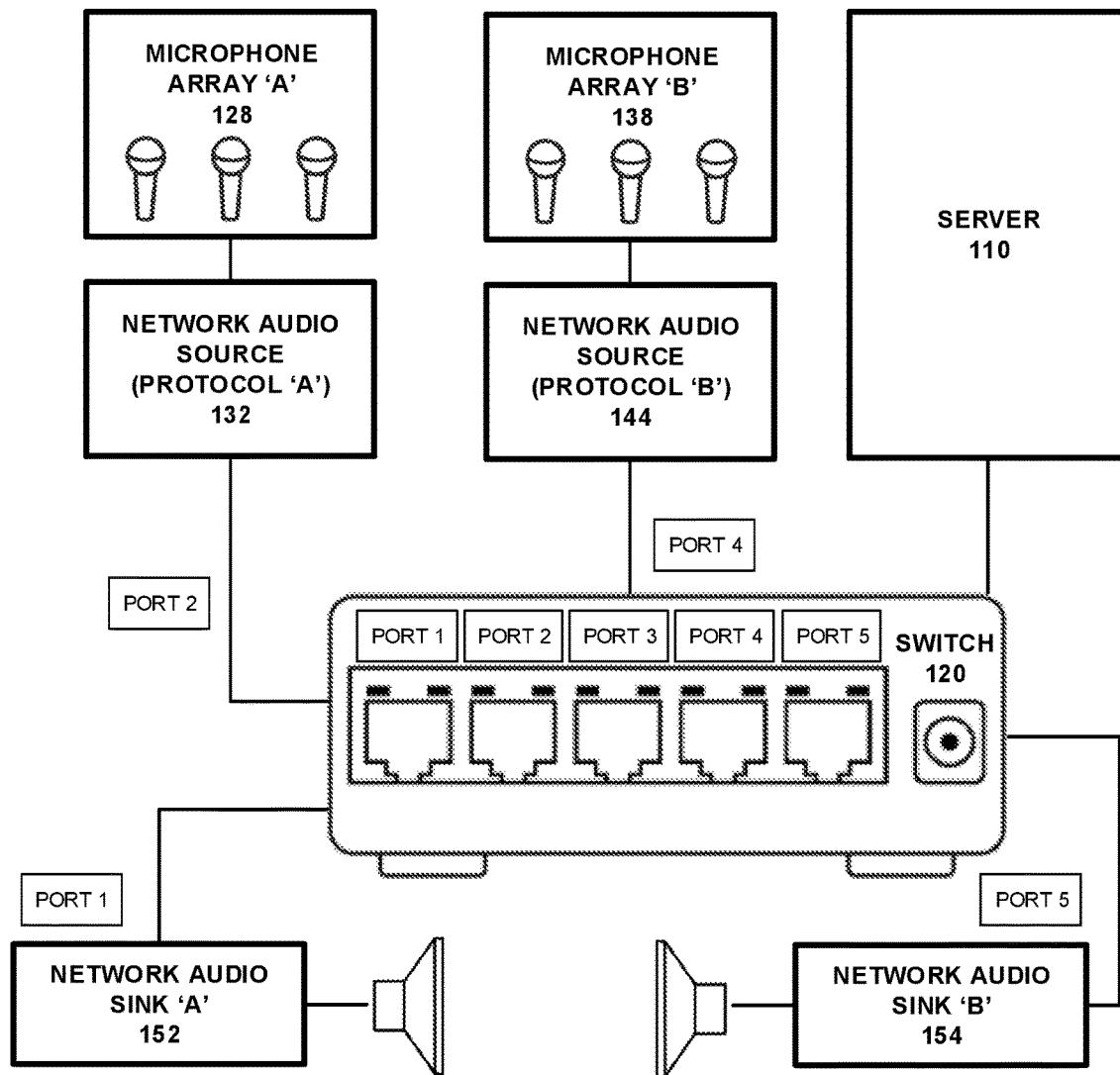
FIG. 1 illustrates an example switch configuration that includes automated port detection according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide network switch capabilities which are not limited to mere packet switching but which include protocol management, data processing and translation, device plug-in support, detection of port usage including but not limited to protocol data traffic detection, device detection, and protocol assignment and provisioning.

In one example embodiment, a process may automatically select what audio/video (A/V) media protocol to accept and support on a particular port of a switch. The process may include detecting an incoming media stream and selecting an appropriate protocol based on a result of the detecting. The process may include allowing or permitting certain protocols and denying others on a port-by-port basis. Instead of denying protocols, the protocols may be assigned to a port after the detection process for a period of time or until the transmission has ended.

Examples of A/V protocols may be protocols which manage audio and video data with time sensitive information and with specific performance characteristics. Examples of A/V protocols may be audio video bridging (AVB) protocol, which is a well-known IEEE protocol. Another protocol may be DANTE, which is commonly used with digital network data especially with media data sent and received across a network.

FIG. 1 illustrates an example switch configuration that includes automated port detection according to example embodiments. Referring to FIG. 1, the example configuration 100 includes a switch 120 that is being implemented as media traffic network element with five ports 1-5. It is important to note that the switch may have any number of ports and five are used only for example purposes. A server 110 may be responsible for updating the switch data, controlling the peripheral audio and video equipment, sending and receiving updates from remote networks, managing control features sent from one or more devices and intended to initiate one or more other devices, etc.

In this example of FIG. 1, the microphone array 'A' 128 may include one or more microphones which are connected to a network audio source 132 as a single network element with a single port assignment to the switch 120. The switch may identify the network data traffic from the audio source 132 as an audio digital protocol 'A' that being used for sending and receiving from port '2'. Based on the traffic detected at port '2', the protocol 'A' is identified from a number of packets sent and received to control the microphone array 128. The switch 120 detects protocol 'A' and configures to port '2' to be used for that protocol for a period of time based on an amount of time and/or the presence of data packets being sent and received. When data is not detected for a period of time during a monitoring operation performed by the server 110 and/or the switch 120, the port '2' designation of protocol 'A' may be reset to no protocol for a future session.

In another example, the microphone array 'B' 138 may include one or more microphones which receive sound and create data traffic via the network audio source device 144. In this example a different A/V protocol may be used, such as protocol 'B' 144, which is detected as packets arriving and being sent from port '4'. The switch 120 may then assign port '4' to that protocol 'B' detected and support the protocol data translation, forwarding, encoding, etc., for a period of time dependent on the use of the protocol 'B' by the device 144. Similarly, the audio sink devices 152 and 154 may control respective loudspeakers which are use different protocols 'A' and 'B' and which are from the audio received by the microphones of the different arrays matching the same protocols. The ports assigned to the sink devices 152 and 154 may be ports '1' and '5', respectively. The switch processor may configure those ports to receive the data via those protocols. In this example port '3' may remain open and unassigned with no particular protocol.

Additionally, certain data forwarding rules may be implemented to forward data to known port entries stored in a table for known devices and/or devices which implement known protocols. The forwarding rules are stored in a table inside a memory of the switch and the rules are set and used for sending management packets to the switch. Port roles may be stored in random access memory (RAM) of switch, such as memory associated with the processor. Applying a port role to a port may include a combination of enabling or disabling protocols on that port and stopping or starting processes on the processor that manages those protocols and adding or removing forwarding database entries to permit or block specific multicast addresses associated with the media protocols. This may include sending management packets to the switch to update forwarding database entries. For the first protocol or AVB protocol, PTP and MSRP protocols may be started or stopped on the selected port. For DANTE or a second protocol, traffic may be blocked or permitted to the MAC addresses associated with certain address network address allocations, for example, 224.0.1.129, 224.0.0.230-224.0.0.232, etc. The forwarding rules are stored in a database in the switch memory and that is what determines where all incoming data packets are sent. The table may include entries that dictate that destination address 'X' is sent out ports 1, 2, etc.

Figure 2:
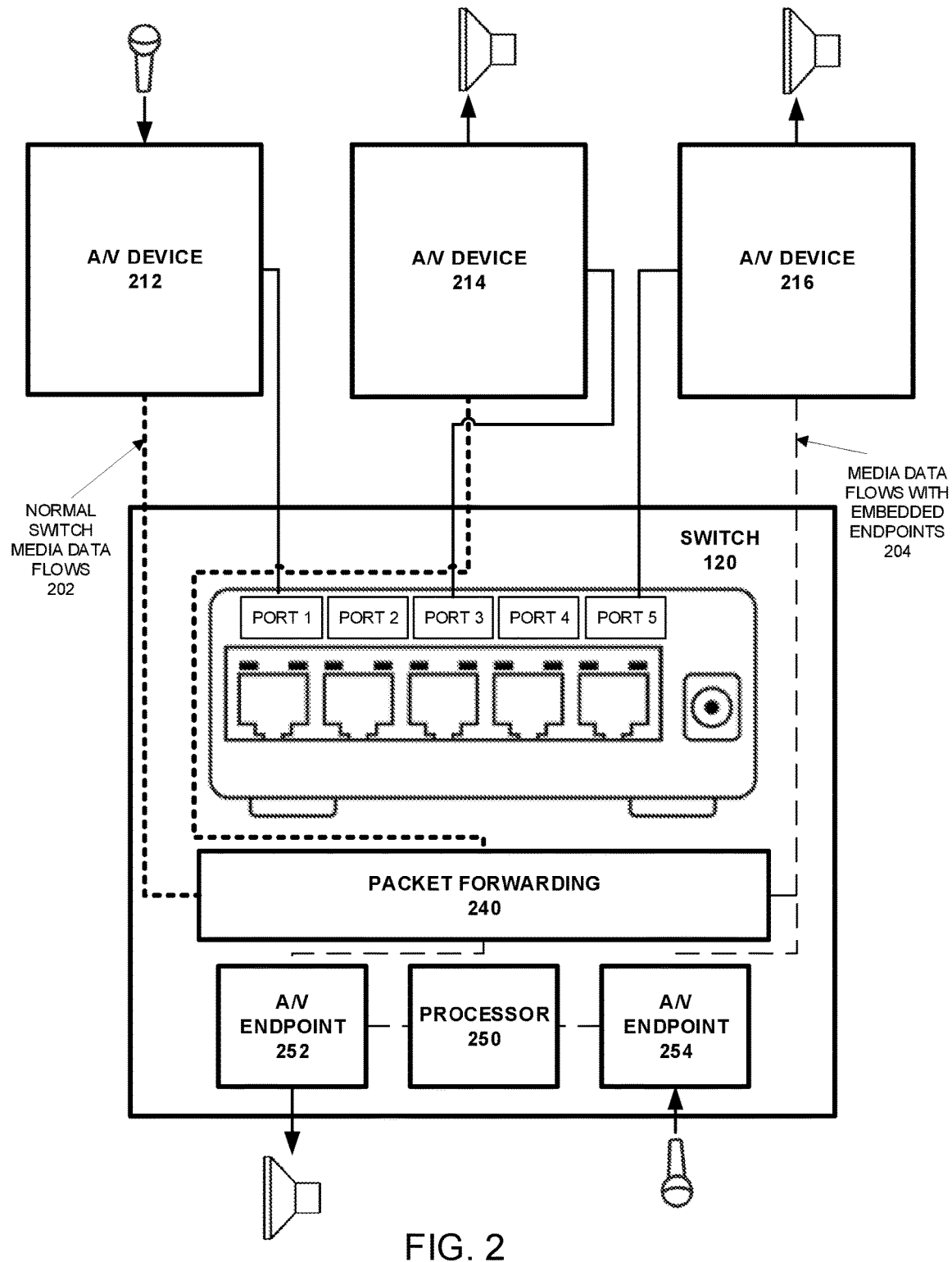
FIG. 2 illustrates an example switch configuration that includes processing, encoding and/or local data consumption according to example embodiments.

FIG. 2 illustrates an example switch configuration that includes processing, encoding and/or local data consumption according to example embodiments. Referring to FIG. 2, the configuration 200 includes a switch 120 with various functions including a packet forwarding module 240 a media processor 250, and one or more endpoint modules 252 and 254 for producing endpoint audio data to a loudspeaker or similar peripheral device. The data flows into and out of the switch 120 may include normal switch media data flows 202

(denoted by fine dotted line) and media data flows 204 intended for embedded media endpoints of the switch (denoted by long dotted line).

In operation, data traffic is received and sent via the switch 120 in the form of digital packets, certain data is forwarded to other network device elements in communication with the switch 120, some is stopped and rendered via an internal processor 250 of the switch and played out of a speaker plugged into an ethernet port via the A/V endpoint 252. Also, traffic may also be copied to the local endpoint as opposed to stopped, the same traffic may also be forwarded out other ports. The traffic selection is based on the MAC destination address in each packet. The selection of which addresses get forwarded out of which ports and/or sent to the local endpoint is determined by forwarding entries inserted by higher level protocols, which may be, for example, MSRP, Internet group management protocol (IGMP) and/or multicast listener discovery protocol (MLD). Devices which are separate from the switch 120 may include various A/V devices 212-216, which or may not be intended for the embedded A/B devices 252 or 254.

The embedded endpoints 252 and 254 may be configured to consume audio data traffic via the switch processor 250. The data may be processed, transcoded, encoded and then sent to other devices, such as the example with A/B device 216. This also permits new audio streams to originate from the switch 120. The switch may forward audio data originated from one of the A/V devices, originate audio data and share the data with an A/V device, such as A/V device 216 and/or play or receive the audio data via a switch connected endpoint 252 or 254.

Figure 3:
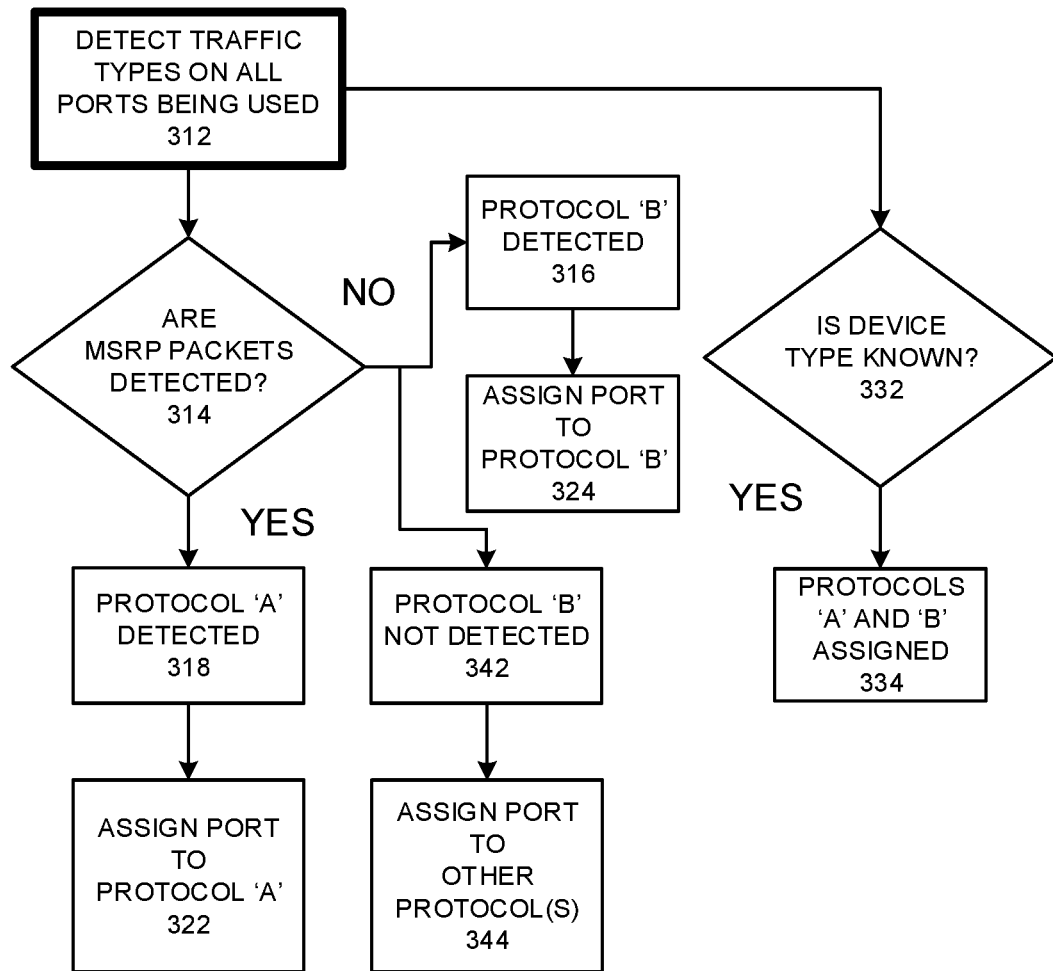
FIG. 3 illustrates a logic flow diagram of a decision process for port and protocol selection according to example embodiments.

FIG. 3 illustrates a logic flow diagram of a decision process for port and protocol selection according to example embodiments. Referring to FIG. 3, the logic diagram 300 includes a process for port protocol assignments. The process includes detecting traffic 312 on all ports being used by a switch. A specific packet protocol may be detected, such as MSRP or another packet type 314 and that may dictate that the ports using that protocol packet type should be assigned a protocol 'A' 318, such as AVB protocol. The assignment may be made 322 and an assignment table stored in memory of the switch may be performed with conditions such as traffic minimums over time, a period of time, and known devices which are registered by IP and/or MAC addresses. If the screened protocol packet type is not detected 314, then additional protocol monitoring may be performed.

Continuing with the same example, if the protocol 'B' detection 316 identifies a packet protocol type 'B', such as DANTE, etc., then the assignment may be made to protocol 'B' 324. The assignment to that port number may be stored in memory. If the protocol is different 342 as identified from the received packets, then another port protocol assignment may be made, such as one or more other protocols 344 different from 'A' and 'B' protocol types. In another example, if the device attached or communicating wirelessly to the port of the switch is a known type 332 as identified from its protocol, hardware address information and/or other identifying attributes, then the protocols assigned may be both the 'A' and 'B' protocols 334.

Figure 4:
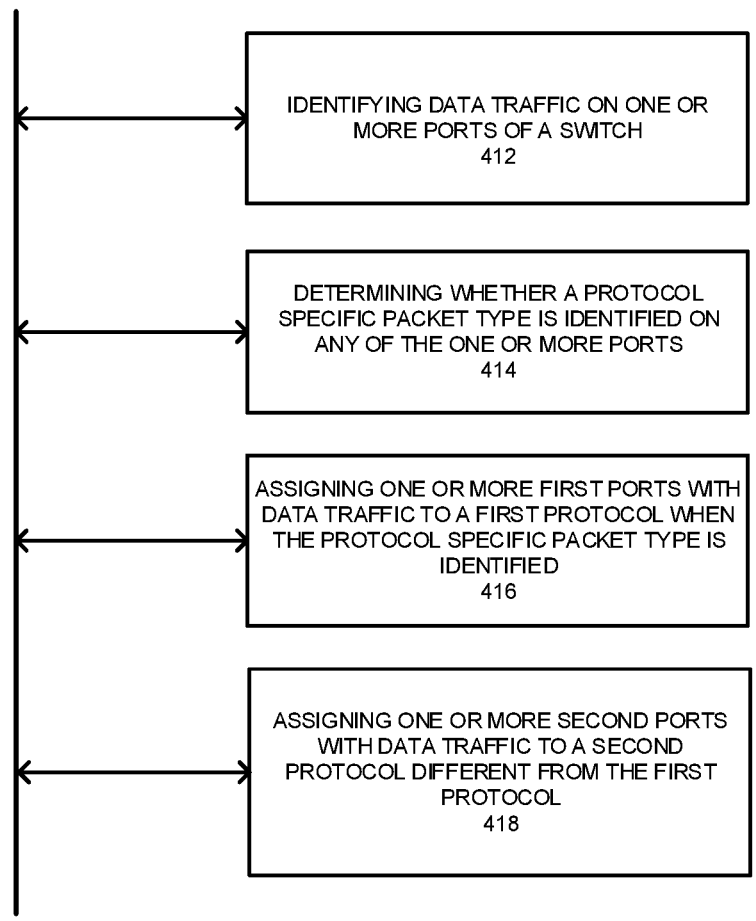
FIG. 4 illustrates a logic flow diagram of an example process for port and protocol selection on a switch according to example embodiments.

FIG. 4 illustrates a logic flow diagram of an example process for port and protocol selection on a switch according to example embodiments. Referring to FIG. 4, the process 400 includes identifying data traffic on one or more ports of a switch 412, the data traffic may be varying types which are in the form of packets of one or more protocols. The data traffic may also be analog or digital audio or other media signals which are being provided to peripheral devices, such as loudspeaker or which are being received from microphones. The ports may be assigned to dedicated network elements, such as other network switches, computers, servers, end user devices, etc. The ports may also be assigned to audio devices or other media devices and the switch may provide the formatted data to those devices so the data can be consumed directly from the switch.

The process may also include determining whether a protocol specific packet type is identified on any of the one or more ports 414, assigning one or more first ports with data traffic to a first protocol when the protocol specific packet type is identified 416, and assigning one or more second ports with data traffic to a second protocol different from the first protocol 418. The assignment of port(s) to a particular protocol may be automatically performed upon detecting a particular protocol packet being received/sent on that port. The protocol of the packet may invoke a type of protocol that is different but often associated with that packet type, such as AVB being assigned to a port having MSPR packets. The protocol assigned to the port may also be a default protocol based on identifying no packets of any kind being present on that port. Any of the port assignments may be stored in a switch memory, and the port data traffic activity may be monitored for the one or more ports for additional data traffic. When one or more of a time window has lapsed or port activity has dropped below a data traffic threshold for one or more of the ports, the port protocol assignment of the one or more ports may be released so the port has no assignment at that time. When a protocol specific packet type is present on any one of the one or more ports, those ports may be assigned, which have the known packet type, to a default protocol type which may be different from the packet type but which may be commonly associated with that packet type. The protocol specific packet type may be a multiple stream reservation protocol (MSRP). The process may also include enabling port forwarding for ports assigned to the second protocol and for network device addresses which are assigned to the second protocol. The network device addresses may be multicast addresses used to receive data.

Figure 5:
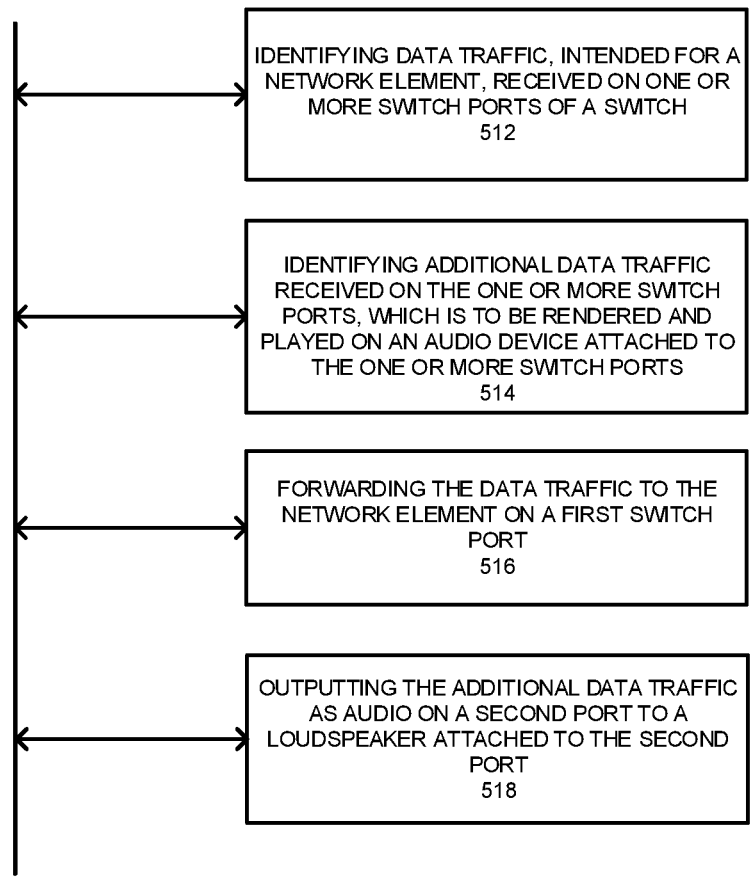
FIG. 5 illustrates a logic flow diagram of an example process for media consumption on a switch according to example embodiments.

FIG. 5 illustrates a logic flow diagram of an example process for media consumption on a switch according to example embodiments. Referring to FIG. 5, the process 500 may include identifying data traffic, intended for a network element, received on one or more switch ports of a switch 512, the data traffic may be destination identified packets which are to be processed by the switch and forwarded to an end device by its network address. The data in this portion may not be intended for the switch as a destination. The process may also include identifying additional data traffic received on the one or more switch ports 514, which is to be rendered and played on an audio device attached to the one or more switch ports, the audio devices may be part of a switch module or A/V sink that is linked to a physical port interface which is attached to a microphone or speaker. The process may also include forwarding the data traffic to the network element on a first switch port 516, and outputting the additional data traffic as audio on a second port to an attached loudspeaker attached to the second port 518. The data may be separated as data to be routed to a destination or data to be terminated via one or more termination devices attached to the switch. The process may also include rendering the additional data traffic into the audio via a switch processor, forwarding the rendered additional data traffic to one or more embedded audio modules of the switch, receiving audio data from a microphone controlled by one or more embedded audio modules of the switch, and processing the audio data into audio packets. The process may also include forwarding the processed audio packets to one or more network devices in communication with the switch and the data traffic may be a data packet format different from the audio packets shared internally on the switch, such as ETHERNET vs. AVB data. The audio data is one or more of processed, transcoded and consumed by an audio endpoint device of the switch.

Figure 6:
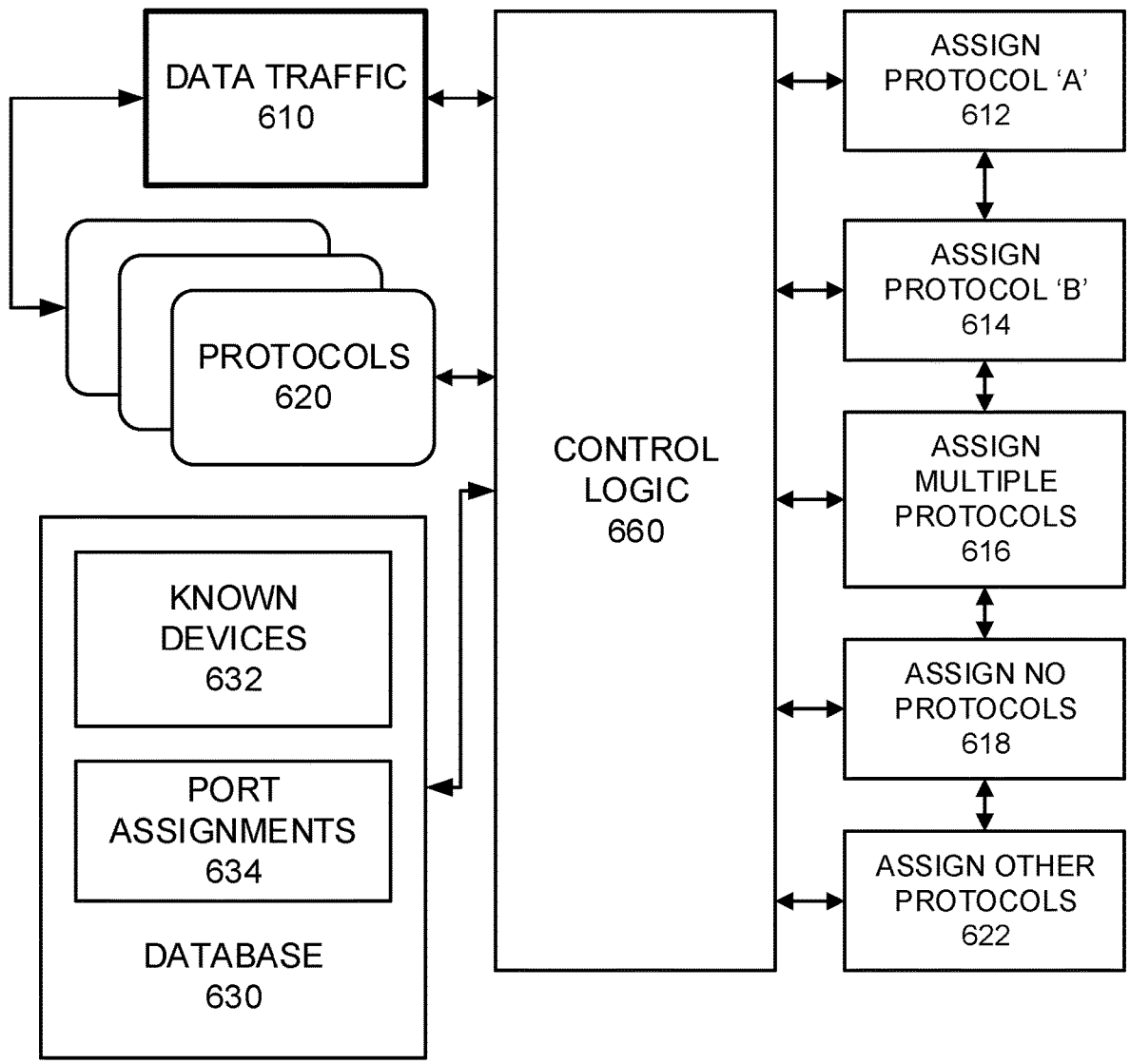
FIG. 6 illustrates a logic processing module identifying input and output produced by a system processor according to example embodiments.

FIG. 6 illustrates a logic processing module identifying input and output produced by a system processor according to example embodiments. Referring to FIG. 6, the processing unit 600 may be a processor 660 that receives certain inputs, such as data traffic 610 from being part of a switch with ports and identifies various protocols 620 and is linked to a database or memory that stores known protocols and devices 632 and a list of port assignments 634. The output of the processing logic 660 may include assignments to various protocols 612, 614, one or more protocols 616, no protocol assignments 618, and other less common protocols 622 which may be assigned to a switch memory to identify how to manage ports of the switch.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent any of the above-described network components of the other figures.

Figure 7:
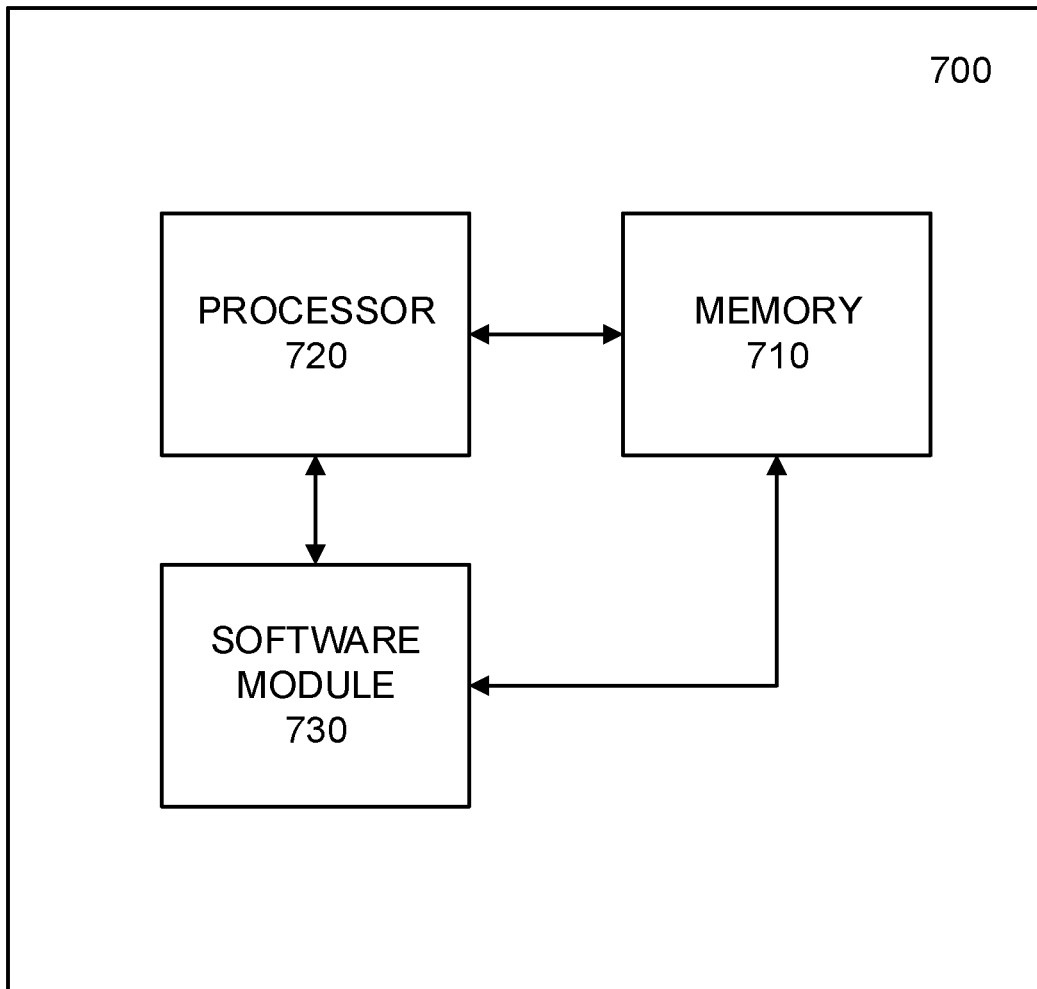
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
identifying data traffic on one or more ports of a switch;
determining a protocol specific packet type of a first protocol is identified as being received on one or more first ports of the one or more ports;
determining another protocol specific packet type of a second protocol is identified as being received on one or more second ports of the one or more ports;
assigning, for a temporary period of time, the one or more first ports of the one or more ports with data traffic to the first protocol;
assigning the one or more second ports of the one or more ports with data traffic to the second protocol different from the first protocol; and
releasing the second protocol assignment of the one or more second ports after identifying there is no presence of packets transmitted or received on the one or more second ports for a monitored period of time.

2. The method of claim 1, comprising
storing the port assignments in a switch memory; and
monitoring port data traffic activity of the one or more ports for additional data traffic.

3. The method of claim 2, comprising
when port activity has dropped below a data traffic threshold for one or more of the ports, releasing the port protocol assignment of the one or more ports.

4. The method of claim 1, comprising
when the first protocol or second protocol specific packet type is present on any one of the one or more ports, assigning a default protocol type.

5. The method of claim 4, wherein the protocol is multiple stream reservation protocol (MSRP).

6. The method of claim 1, comprising
enabling port forwarding for ports assigned to the second protocol and for network device addresses which are assigned to the second protocol.

7. The method of claim 6, wherein the network device addresses are multicast addresses.

8. An apparatus comprising:
a processor configured to
identify data traffic on one or more ports;
determine a protocol specific packet type of a first protocol is identified as being received on one or more first ports of the one or more ports;
determine another protocol specific packet type of a second protocol is identified as being received on one or more second ports of the one or more ports;
assign, for a temporary period of time, the one or more first ports of the one or more ports with data traffic to the first protocol
assign the one or more second ports of the one or more ports with data traffic to the second protocol different from the first protocol; and
release the second protocol assignment of the one or more second ports after identifying there is no presence of packets transmitted or received on the one or more second ports for a monitored period of time.

9. The apparatus of claim 8, wherein the processor is further configured to
store the port assignments in a switch memory; and
monitor port data traffic activity of the one or more ports for additional data traffic.

10. The apparatus of claim 9, wherein the processor is further configured to
when port activity has dropped below a data traffic threshold for one or more of the ports, release the port protocol assignment of the one or more ports.

11. The apparatus of claim 8, wherein the processor is further configured to
when the first protocol or second protocol specific packet type is present on any one of the one or more ports, assign a default protocol type.

12. The apparatus of claim 11, wherein the protocol is multiple stream reservation protocol (MSRP).

13. The apparatus of claim 8, wherein the processor is further configured to
enable port forwarding for ports assigned to the second protocol and for network device addresses which are assigned to the second protocol.

14. The apparatus of claim 13, wherein the network device addresses are multicast addresses.

15. A non-transitory computer readable storage medium configured to store instructions that when executed cause a processor to perform:
identifying data traffic on one or more ports of a switch;
determining a protocol specific packet type of a first protocol is identified as being received on one or more first ports of the one or more ports;
determining another protocol specific packet type of a second protocol is identified as being received on one or more second ports of the one or more ports;
assigning, for a temporary period of time, the one or more first ports of the one or more ports with data traffic to the first protocol;
assigning the one or more second ports of the one or more ports with data traffic to the second protocol different from the first protocol; and
releasing the second protocol assignment of the one or more second ports after identifying there is no presence of packets transmitted or received on the one or more second ports for a monitored period of time.

16. The non-transitory computer readable storage medium of claim 15, wherein the processor is further configured to perform:
storing the port assignments in a switch memory; and monitoring port data traffic activity of the one or more ports for additional data traffic.

17. The non-transitory computer readable storage medium of claim 16, wherein the processor is further configured to perform:
when port activity has dropped below a data traffic threshold for one or more of the ports, releasing the port protocol assignment of the one or more ports.

18. The non-transitory computer readable storage medium of claim 15, wherein the processor is further configured to perform:
when the first or second protocol specific packet type is present on any one of the one or more ports, assigning a default protocol type.

19. The non-transitory computer readable storage medium of claim 18, wherein the protocol is multiple stream reservation protocol (MSRP).

20. The non-transitory computer readable storage medium of claim 15, wherein the processor is further configured to perform:
enabling port forwarding for ports assigned to the second protocol and for network device addresses which are assigned to the second protocol.

* * * * *